US008827171B2

(12) United States Patent
Choi et al.

(10) Patent No.: US 8,827,171 B2
(45) Date of Patent: Sep. 9, 2014

(54) VEHICULAR AUTOMATIC TEMPERATURE REGULATION SYSTEM

(75) Inventors: Dave Choi, Marysville, OH (US); Mark D. Herbert, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 743 days.

(21) Appl. No.: 13/090,367

(22) Filed: Apr. 20, 2011

(65) Prior Publication Data
US 2012/0267442 A1  Oct. 25, 2012

(51) Int. Cl.
*G05D 23/00* (2006.01)
*B60H 1/00* (2006.01)
*G05D 23/19* (2006.01)

(52) U.S. Cl.
CPC ........ *G05D 23/1902* (2013.01); *B60H 1/00778* (2013.01); *B60H 1/00657* (2013.01)
USPC ............................................. 236/51; 700/276

(58) Field of Classification Search
CPC ........... B60H 1/00778; B60H 1/00657; B05D 23/1902
USPC ............................. 236/49.3, 51; 700/276, 277
See application file for complete search history.

(56) References Cited

U.S. PATENT DOCUMENTS

| 5,600,323 | A | 2/1997 | Boschini |
| 6,885,285 | B2 | 4/2005 | Losey |
| 6,949,021 | B2 * | 9/2005 | Ichishi et al. ................... 454/75 |
| 6,949,882 | B2 | 9/2005 | Suyama et al. |
| 7,190,253 | B2 | 3/2007 | Shimomura |
| 7,292,134 | B2 | 11/2007 | Conner et al. |
| 7,441,414 | B2 | 10/2008 | Ziehr et al. |
| 7,650,864 | B2 | 1/2010 | Hassan et al. |
| 7,683,757 | B2 | 3/2010 | King et al. |

* cited by examiner

*Primary Examiner* — Marc Norman
(74) *Attorney, Agent, or Firm* — Rankin, Hill & Clark LLP

(57) ABSTRACT

An automatic vehicle temperature regulation system regulates and/or adjusts a cabin temperature based in part on a separation distance between a user and an associated vehicle. The system includes a portable transceiver, a fixed transceiver provided in the associated vehicle and configured to communicate with the portable transceiver, a temperature adjusting system configured to perform operations which adjust a temperature within a vehicle cabin, and a controller in communication with the fixed transceiver and the temperature adjusting system. The controller determines a distance between the portable transceiver and the fixed transceiver, and variably controls the temperature adjusting system based on the determined distance between the portable transceiver and the fixed transceiver. The controller may also recognize three distance-defined zones extending outwardly from the vehicle, and may control the temperature adjusting system to perform unique operations depending on which zone the portable transceiver is detected to be in.

21 Claims, 4 Drawing Sheets

VEHICULAR AUTOMATIC TEMPERATURE REGULATION SYSTEM

BACKGROUND

The present disclosure generally relates to a vehicular system for automatic temperature regulation, and more particularly relates to a system for automatically regulating a vehicle temperature based on a user's proximity to the vehicle.

Improvements in wireless technology have allowed vehicle control systems to further incorporate keyless and passive entry systems for improved convenience. Such systems may generally be incorporated through the use of a key-fob which allows a user to selectively lock and unlock vehicle doors, and to open vehicle trunk hatches. More advanced versions of such systems may allow for the passive (e.g., without input by the user) unlocking of vehicle doors upon detection of a recognized key-fob within a predetermined range from the vehicle.

However, conventional keyless and passive entry systems may not be taking full advantage of the technological capabilities of the wireless technology. While other wireless vehicle systems have been put in place using the technology, such as remote and passive vehicle start systems, several vehicle features may still benefit from the wireless technology being used in remote and passive entry vehicle systems.

SUMMARY

According to one aspect, an automatic vehicle temperature regulation system comprises a portable transceiver, a fixed transceiver, a temperature adjusting system, and a controller. The fixed transceiver is provided in an associated vehicle and is configured to communicate with the portable transceiver. The temperature adjusting system is configured to perform operations which adjust a temperature within a vehicle cabin. The controller is in communication with the fixed transceiver and the temperature adjusting system, and is configured to determine a distance between the portable transceiver and the fixed transceiver and to variably control the temperature adjusting system based on the determined distance between the portable transceiver and the fixed transceiver.

According to another aspect, a vehicle ECU comprises a fixed transceiver and a controller in communication with the fixed transceiver. The fixed transceiver is configured to communicate with a portable transceiver. The controller is configured to determine a distance between the portable transceiver and the fixed transceiver, and to variably control a vehicle temperature adjusting system based on the determined distance between the portable transceiver and the fixed transceiver.

According to still another aspect, a method for automatically regulating vehicle cabin temperature comprises recognizing a plurality of predefined zones extending outwardly from the vehicle and detecting a portable transceiver within any of the plurality of predefined zones. Further, a determination of which of the predefined zones the portable transceiver is disposed in is made, and a vehicle temperature adjusting system is operated in a unique manner based on the predefined zone in which the portable transceiver is disposed.

DETAILED DESCRIPTION

Figure 1:
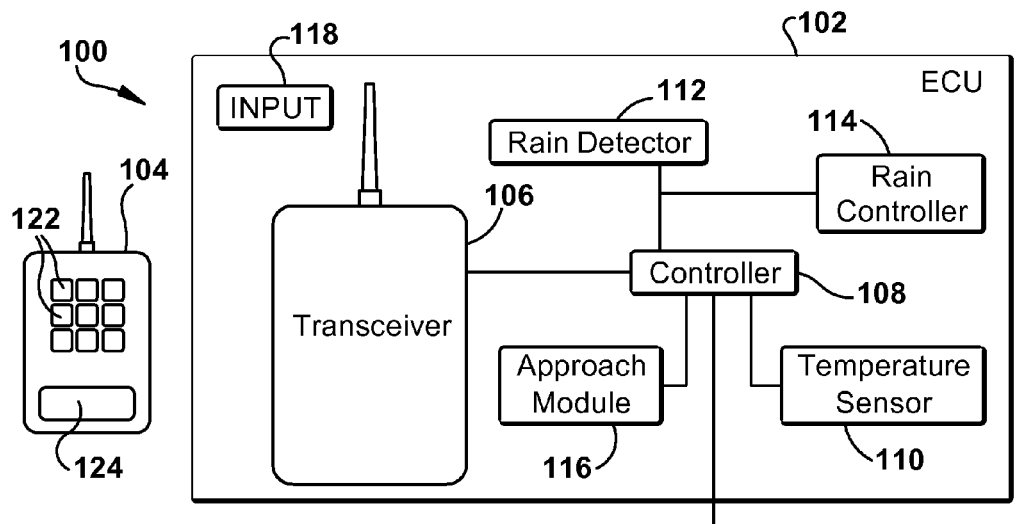
FIG. 1 is a block-schematic illustrating an automatic vehicle temperature regulation system.

The description and drawings herein are merely illustrative and various modifications and changes can be made in the structures disclosed without departing from what is defined in the appended claims. All references to direction and position, unless otherwise indicated, refer to the orientation of the structures and components illustrated in the drawings and should not be construed as limiting the claims appended hereto. Like numbers refer to like parts throughout the several views.

FIG. 1 illustrates an automatic vehicle temperature regulation system 100 (hereinafter, "system 100") which operates to regulate a vehicle cabin temperature based on a detected or determined proximity of a user to a vehicle 200. The system 100 includes a vehicle electronic control unit 102 (hereinafter, "ECU 102") in communication with a portable transceiver 104. The ECU 102 may include a fixed transceiver 106, a controller 108, a temperature sensor 110, a rain detector 112, a rain controller 114, an approach module 116, and an input mechanism 118. Furthermore, the ECU 102 is in communication with, and controls, temperature adjusting systems 120.

The ECU 102 may take the form of any processor or control unit capable of performing the herein described functions. Furthermore, the ECU 102 may be configured to perform functions beyond those described herein. In this regard, the ECU 102 may take the form of a known vehicle electronic control unit which includes the herein described structure and functionality. Accordingly, the ECU 102 will not be described in detail herein save for a description of the structure and functionality relevant to the instant disclosure.

With continuing reference to FIG. 1, it is noted that several components are illustrated as being incorporated within the ECU 102. It is to be appreciated that any or all of these components may be provided externally from the ECU 102. In such a configuration, the components may communicate with the ECU 102. It is to be further appreciated that the herein described ECU 102 may not be a main or principal vehicle electronic control unit. Rather, the herein described ECU 102 may be a separate electronic control unit configured to automatically regulate a vehicle cabin temperature, and may or may not be in communication with the principal vehicle electronic control unit. Furthermore, the components illustrated as being incorporated within the ECU 102 may be provided as separate modules within the ECU 102, or may be incorporated in existing ECU modules.

The fixed transceiver 106 and the portable transceiver 104 are paired devices configured to send and receive signals. More particularly, the fixed transceiver 106 is in communication with the portable transceiver 104 such that signals can be sent and received between the two. Transceivers are generally known in the art, and as such the description herein will only be made in a general manner. The fixed transceiver 106 and the portable transceiver 104 may communicate with one another using any known wireless technology. For example, the fixed transceiver 106 and the portable transceiver 104 may communicate using a Bluetooth network, radio signals, cellular telephone signals, or any other manner of wireless communication. Accordingly, the fixed transceiver 106 and the portable transceiver 104 are configured to perform wireless communication via any one or more wireless communication channels.

With further respect to the fixed transceiver 106, it is noted that the fixed transceiver 106 is provided in an associated vehicle. Accordingly, the fixed transceiver 106 is "fixed" in the vehicle, though the vehicle is movable. Furthermore, the fixed transceiver 106 is in communication with the ECU 102, as well as the controller 108 (either directly or indirectly via the ECU 102). At least one of the ECU 102, the controller 108, and the fixed transceiver 106 is configured to determine a distance between the fixed transceiver 106 and the portable transceiver 104. The distance determination may be made by any method which allows for such determination, such as through a strength of signal analysis for signals received by the fixed transceiver 106 from the portable transceiver 104. Separation distance determination between two devices in wireless communication with each other is generally known, and as such will not be described in detail herein.

The portable transceiver 104 is configured in a similar manner to the fixed transceiver 106. Particularly, the portable transceiver 104 is a device capable of sending and receiving signals to and from the fixed transceiver 106. The portable transceiver 104 may be provided as part of a key for the vehicle or as a component which is intended to travel with the vehicle keys, such as a key-fob. As shown in FIG. 1, the portable transceiver 104 is equipped with a plurality of control buttons 122 and a portable input mechanism 124. The plurality of control buttons 122 may allow the user to initiate a vehicle lock/unlock operation, a vehicle trunk or door open/close operation, a vehicle alarm operation, a vehicle engine start operation, a manually input user temperature regulation operation, etc. The portable input mechanism 124 is provided to allow the user to transmit instructions from the portable transceiver 104 to the fixed transceiver 106 which are not simply applied through a button or switch. For example, as described in further detail below, the portable input mechanism 124 may allow the user to enter a threshold cabin temperature Tt.

It is to be appreciated that the portable transceiver 104 and the fixed transceiver 106 are coupled devices which operate to identify one another upon sending and/or receiving signals from each other. Further, though described above as being a key-fob, the portable transceiver may take the form of any other device capable of sending and receiving signals and otherwise interacting with the fixed transceiver 106. For example, the portable transceiver 104 may be implemented via a user's cellular telephone or other similar system. In this regard, the portable transceiver 104, as operable with the herein described system 100, may not necessarily include the plurality of buttons 122. The fixed transceiver 106 is in communication with the controller 108 and/or the ECU 102 so as to relay instruction signals received from the portable transceiver 104.

The temperature sensor 110 is configured to sense, determine, or estimate a vehicle cabin temperature. The temperature sensor 110 may be provided within the vehicle cabin, or may be provided outside of the vehicle cabin. The temperature sensor 110 may take the form of any device capable of sensing, determining, or otherwise estimating a temperature within the vehicle cabin. The temperature sensor 110 is in communication with at least one of the ECU 102 and the controller 108.

The rain detector 112 is configured to detect, sense, or otherwise determine the existence of a raining condition, and may take the form of any device capable of performing such a function. For example, the rain detector 112 may include ultrasonic sensors disposed on an exterior of the vehicle which are configured to detect rain drops contacting the vehicle. Alternatively, the rain detector 112 may be a humidity or moisture sensor configured to detect the raining condition. The rain detector 112 is in communication with the controller 108, and may also be in communication with the ECU 102.

The rain controller 114 is configured to provide a prevent signal to the controller 108 when the raining condition is detected by the rain detector 112. The rain controller 114 may take the form of a processing or control unit, or alternatively may be software-implemented within the controller 108 or ECU 102, or may be integrally provided with the rain detector 112. As illustrated, the rain controller 114 is in communication with the rain detector 112 and the controller 108, and may also be in communication with the ECU 102.

The approach module 116 is configured to detect whether the portable transceiver 104 is moving toward (approaching) or away from the fixed transceiver 106. The particular configuration of the approach module 116 will depend on the manner in which the controller 108 and/or the ECU 102 determine a distance between the fixed transceiver 106 and the portable transceiver 104. For example, if the distance between the fixed transceiver 106 and the portable transceiver 104 is determined based on the strength of the signal received by the fixed transceiver 106, the approach module 116, which is in communication with the controller 108, may operate to monitor changes in the received signal strength.

With reference to this exemplary approach determination algorithm, if the signal strength is increasing over time, the portable transceiver 104 is determined to be approaching the fixed transceiver 106; conversely, if the signal strength is decreasing over time, the portable transceiver 104 is determined to be moving away from the fixed transceiver 106. Other methods for approach determination may be used, including monitoring a determined distance of separation between the fixed transceiver 106 and the portable transceiver 104 over time, and determining an approach condition when the distance of separation decreases and a moving away condition when the distance separation increases. Further, the system 100 may provide GPS location determination, which may be utilized by the approach module 116 to determine whether the portable transceiver 104 is approaching or moving away from the fixed transceiver 106.

The approach module 116 may be a stand-alone module within the ECU 102, or may be incorporated into the ECU 102, the controller 108, and/or the fixed transceiver 106. Furthermore, the approach module 116 may be configured so as to perform any manner of approach determination. As will be described in further detail below, the controller 108 may control the temperature adjusting systems 120 based, in part, on whether the portable transceiver 104 is approaching or moving away from the fixed transceiver 106.

The input mechanism 118 may be provided within the vehicle in any known manner. Generally, the input mechanism 118 provides the user with an ability to input information or otherwise interact with the ECU 102 and/or other electronically controlled vehicle components or systems. The input mechanism 118 may be provided via a user interface or display, or in any other manner. With reference to the herein described system 100, the input mechanism 118 may be operable to allow the user to set the desired or threshold cabin temperature Tt, as is described in further detail below.

The controller 108 is configured to receive inputs from the ECU 102, the fixed transceiver 106, the temperature sensor 110, the rain detector 112, the rain controller 114, the approach module 116, and the input mechanism 118. The controller 108 is further configured to process the received inputs and to control the temperature adjusting systems 120 based thereon. The controller 108 may be a module provided within the ECU 102, may be software implemented within the ECU 102, or may be provided externally from and in communication with the ECU 102. It is to be appreciated that the ECU 102 may be provided with more than one controller, though the controller 108 is described herein as the controller 108 operable with the system 100. It is further to be appreciated that the controller 108 may be a single unit, or may comprise several units. To facilitate the understanding of the instant disclosure, a single controller 108 is described only with reference to the structural and functional features of the system 100.

As mentioned above, the controller 108 is in communication with and controls the temperature adjusting systems 120. As used herein, the temperature adjusting systems 120 include any and all systems or components within the vehicle 200 which are operable to adjust a temperature within the vehicle cabin. For example, the temperature adjusting systems 120 may include: controllers operable to open and close vehicle windows, controllers operable to open and close retractable vehicle roof panels, a vehicle heating, ventilation, and air conditioning system (HVAC system), vehicle seat heaters and ventilators, a vehicle steering wheel heater and ventilator, and a rear window defrost. The foregoing list intended to exemplify the temperature adjusting systems 120, and is not an exhaustive list of the systems which are included in the temperature adjusting systems 120. Furthermore, insofar as particular temperature adjusting systems are illustrated in FIG. 1, the particular systems may include a controller which operates the systems (if other than the controller 108 and/or the ECU 102), the systems themselves, or some combination thereof.

It is noted that the temperature adjusting systems 120 may each be operable to perform a cooling operation or a heating operation. With respect to automatic temperature control or regulation, the temperature adjusting systems 120 may be electronic systems which are controlled by the ECU 102 and/or the controller 108. Additionally, the temperature adjusting systems 120 may be controlled through direct command by the user through the input mechanism 118 or other means.

The temperature adjusting systems 120, as described herein, may be controlled by the controller 108 based on a determined distance between the portable transceiver 104 and the fixed transceiver 106. Particularly, the controller 108 may variably control the temperature adjusting systems 120 based on the determined distance between the portable transceiver 104 and the fixed transceiver 106. It is noted that an assumption made herein is that the portable transceiver 104 is in the possession of the user. As such, the system 100 allows for variable vehicle cabin temperature control/regulation which is based/dependent upon the proximity of the user to the vehicle 200.

Figure 3A:
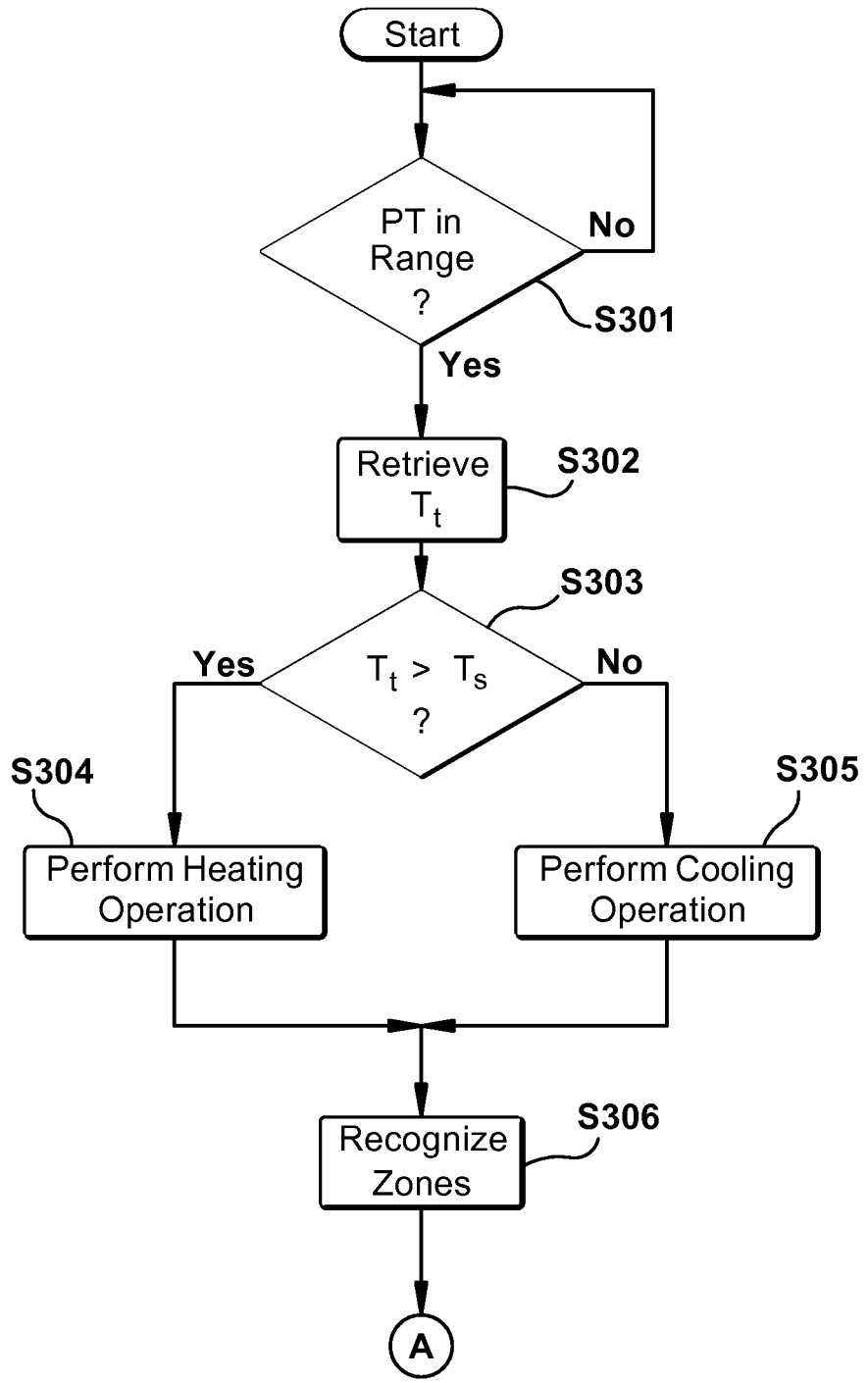
FIG. 3A and FIG. 3B illustrate a for a method for automatic vehicle temperature regulation.
Figure 3B:
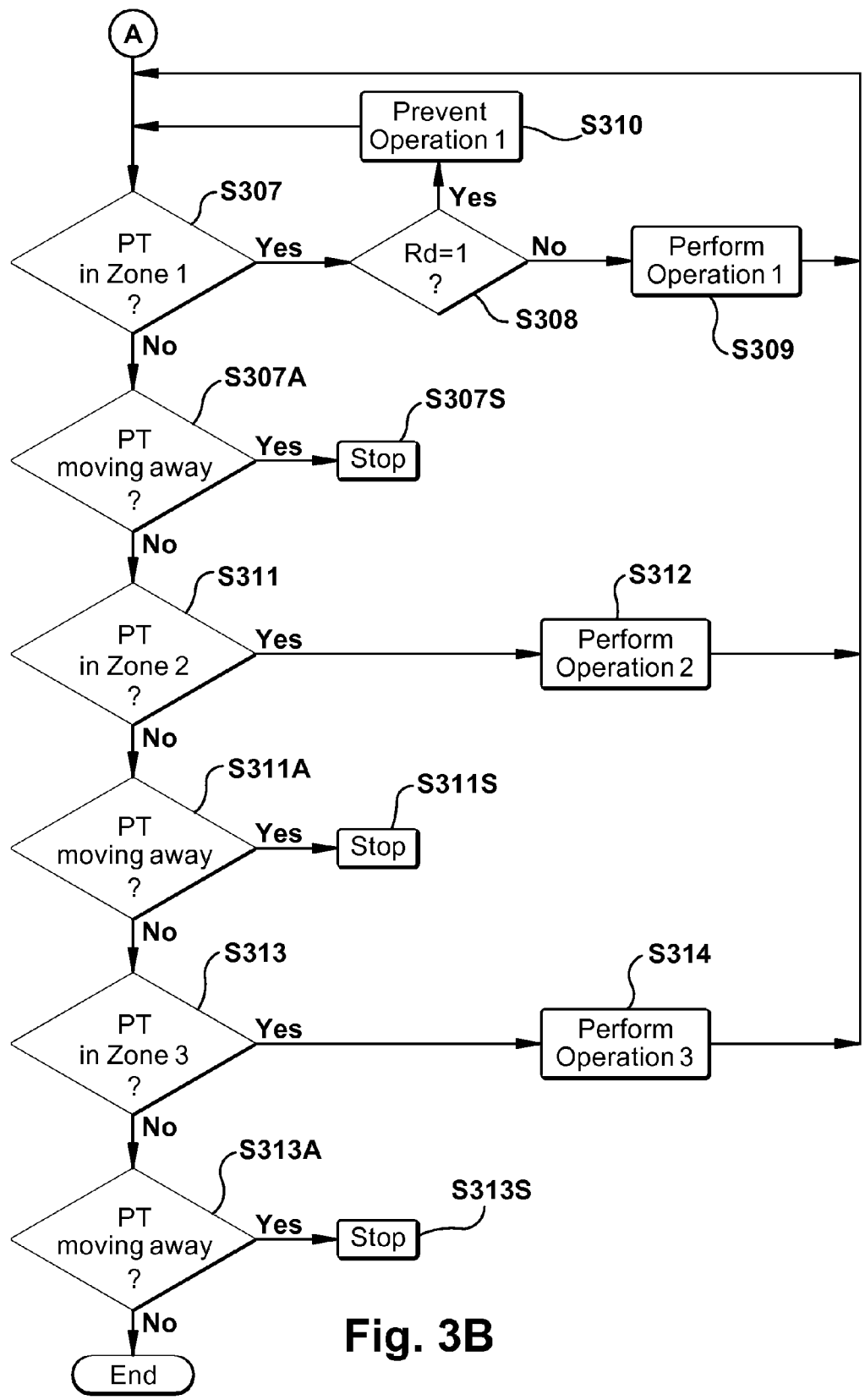

An exemplary method for automatically controlling/regulating vehicle cabin temperature using the system 100 is described with reference to FIGS. 3A and 3B. The method begins with a detection of the portable transceiver 104 (indicated as "PT" in the drawings), herein presumed to be a key-fob, within range of the fixed transceiver 106 (S301). With respect to the detection, it is noted that both the portable transceiver 104 and the fixed transceiver 106 periodically transmit interrogation signals to determine if the coupled transceiver is within range (e.g., is within a range of communication). As the fixed transceiver 106 is provided in the vehicle 200 and is in direct communication with the controller 108 and ECU 102, the fixed transceiver 106 may operate to detect the portable transceiver 104. It is noted that certain forms of wireless communication between the portable and fixed transceivers 104, 106 may allow for continuous contact therebetween, rendering this portion of the method unnecessary.

Once the portable transceiver 104 is detected to be within range, the controller 108 proceeds to retrieve the threshold vehicle cabin temperature Tt (S302). The setting of the threshold vehicle cabin temperature Tt is described in further detail below. The controller 108 further receives an input from the temperature sensor 110 indicating a sensed vehicle cabin temperature Ts, which is the sensed vehicle cabin temperature at the time of detecting the portable transceiver 104 to be in range.

The threshold cabin temperature Tt and the sensed cabin temperature Ts are then compared (S303), and the controller 108 determines whether to perform a heating operation or a cooling operation based on the comparison. Particularly, if the sensed cabin temperature Ts is less than the threshold cabin temperature Tt, the controller 108 determines that a heating operation should be performed such that the sensed cabin temperature Ts approaches the threshold cabin temperature Tt (S304). Alternatively, if the sensed cabin temperature Ts is greater than the threshold cabin temperature Tt, the controller 108 determines that a cooling operation should be performed such that the sensed cabin temperature Ts approaches the threshold cabin temperature Tt (S305).

Figure 2:
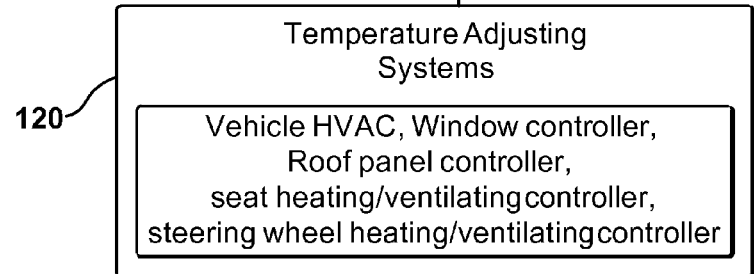
FIG. 2 is an overhead view illustrating exemplary predefined/distance-defined zones extending outwardly from a vehicle.
Figure 2:
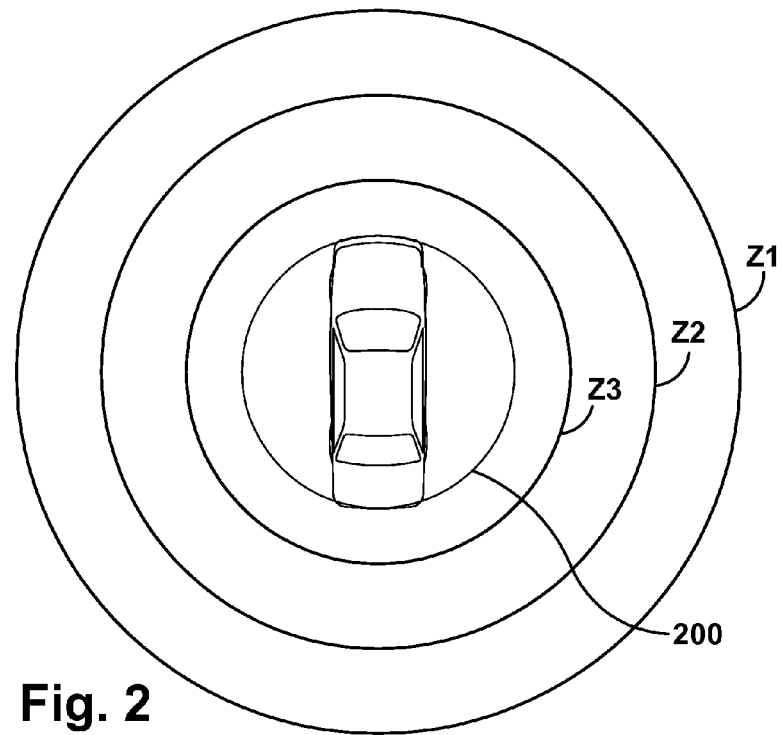

The controller 108 further recognizes a plurality of distance-defined zones extending outwardly from the fixed transceiver 106 (S306). The distance-defined zones are predefined zones which may be generally or substantially annular shaped and concentric with one another. FIG. 2 illustrates exemplary distance-defined zones extending outwardly from the vehicle 200. As shown in FIG. 2, three substantially annular shaped and concentric zones extend outwardly from the vehicle 200. It is noted that the vehicle 200 is illustrated as being at a central point of the annular zones, which assumes the fixed transceiver 106 is at a central point of the vehicle 200. This need not necessarily be the case, and the plurality of zones may have a center-point off-set from a center-point of the vehicle 200.

As shown, the distance-defined zones include a first zone Z1, a second zone Z2, and a third zone Z3. Each of the zones have inner and outer circumferences which are set according to outwardly extended radii from the vehicle. As such, each zone is defined as encompassing a range of distances between the fixed transceiver 106 and the portable transceiver 104. With respect to the illustrated zones, the third zone Z3 is the zone disposed closest to the vehicle 200, and may alternatively be a circle which includes the vehicle 200. The second zone Z2 is disposed just beyond the third zone Z3 and has an inner circumference defined by the outer circumference of the third zone Z3. The first zone Z1 is the zone furthest away from the vehicle 200, and has an inner circumference defined by the outer circumference of the second zone Z2.

Preferably, the outermost first zone Z1 has an outer radius from the fixed transceiver 106 which is less than a distance within which the portable transceiver 104 can be detected by the fixed transceiver 106. For example, the outer radius of the first zone Z1 may be 200 feet. With respect to the second and third zones Z2, Z3, the outer radius of the second zone Z2 may be 100 ft. and the outer radius of the third zone Z3 may be 50 feet. It is to be appreciated that the zones Z1, Z2, Z3 may take any shape and cover any distance ranges from the vehicle 200. It is further to be appreciated that while three zones are illustrated, there may be more or fewer zones recognized by the controller 108, and that each of the zones may include various distance ranges.

The method continues to determine whether the portable transceiver 104 is disposed in any of the distance-defined zones Z1-Z3. More particularly, it is determined whether the portable transceiver 104 is disposed in the first zone Z1 (S307), the second zone Z1 (S311), or the third zone Z3 (S313). When the portable transceiver 104 is determined to be disposed in the first zone Z1 (S307—YES), the controller 108 may control the temperature adjusting systems 120 to perform a first operation (S309). As described herein, the first operation includes opening at least one of the vehicle windows and/or retractable roof panels when performing the cooling operation.

To ensure that opening any of the windows and/or retractable roof panels will not damage the vehicle 200, a determination of whether a raining condition exists is made by the rain detector 112 (S308). The rain detector 112 is considered to provide a binary signal where the raining condition yields Rd=1 and a non-raining condition yields Rd=0. If the raining condition is not detected, (S308—NO, e.g., the non-raining condition is detected and Rd=0), the controller 108 controls the temperature adjusting systems 120 to perform the first operation (S309), which includes opening at least one of the vehicle windows and/or retractable roof panels. The precise amount of opening of any of the vehicle windows and/or retractable roof panels may be preset or may be based on a difference between the threshold cabin temperature Tt and the sensed cabin temperature Ts.

However, if the rain detector 112 detects the raining condition (S308—YES, Rd=1), the rain controller 114 operates to send a prevent signal to the controller 108 (S310). The controller 108, upon receipt of the prevent signal, does not control the window and roof panel controllers to open the vehicle windows and/or retractable roof panels. Moreover, if any of the vehicle windows and/or retractable roof panels are already opened, the controller 108 may control the window and roof panel controllers to close the opened windows and/or retractable roof panels.

It is noted that opening any of the vehicle windows and/or retractable roof panels during performance of the heating operation may be undesirable. As such, when performing the heating operation, the controller 108 may control the temperature adjusting systems 120 to either close the vehicle windows and/or retractable roof panels, or to ensure that the vehicle windows and/or retractable roof panels are closed. As an alternative, the controller 108 may control the temperature adjusting systems 120 in any other manner to facilitate the heating operation.

While controlling the temperature adjusting systems 120 to perform the first operation, the controller 108 continues to monitor the position of the portable transceiver 104 relative to the fixed transceiver 106. When the portable transceiver 104 is detected in the second zone Z2 (S311), the controller 108 controls the temperature adjusting systems 120 to perform a second operation (S312). The second operation may include controlling the temperature adjusting systems 120 to activate the vehicle seat and steering wheel ventilating or heating systems. The second operation may further include cancellation of the first operation, such as controlling the window and roof panel controllers to close any opened windows or retractable roof panels (if performing cooling operation).

The controller 108 continues to detect the position of the portable transceiver 104 relative to the fixed transceiver 106. Once detected to be in the third zone Z3 (S313), the controller 108 controls the temperature adjusting systems 120 to perform a third operation. The third operation may include operation of the vehicle HVAC system (S314). Exemplary operation of the vehicle HVAC system may include operating the fans and the heating or air conditioning such that temperature adjusting air is emitted into the vehicle cabin.

With further reference to the above-described method, it is noted that once the portable transceiver 104 is detected to be in the outermost first zone Z1 and the first operation commences, the controller 108 and the approach module 116 continue to monitor the position of the portable transceiver 104 relative to the fixed transceiver 106 (S307A, S311A, S313A). If the approach module 116 determines that the portable transceiver 104 is moving away from the fixed transceiver 106, a stop signal is sent to the controller 108, which then controls the temperature adjusting systems 120 to cease any of the commenced first, second, and/or third operations (S307S, S311S, S313S).

It is to be appreciated that the first, second, and third operations, as described above, may be altered or changed. The system 100 described herein is operable to allow for unique vehicle cabin temperature adjustment via unique temperature adjusting systems 120 operation dependent upon a separation distance between the portable transceiver 104 and the fixed transceiver 106, or dependent upon which of a plurality of predefined zones the portable transceiver 104 is detected to be disposed in. In sum, the controller 108 is configured to determine a distance between the portable transceiver 104 and the fixed transceiver 106 and to variably control the temperature adjusting systems 120 based on the determined distance between the portable transceiver 104 and the fixed transceiver 106 (with or without referencing or recognizing distance-defined zones).

It has been determined that the cooling operation is made most efficient by first opening the vehicle windows and/or retractable roof panels (Zone 1), followed by activating the seat and/or steering wheel ventilation systems (Zone 2), followed by activating the vehicle HVAC system (Zone 3). Particularly, controlling the temperature adjusting systems 120 to perform the above-described operations in order as the user and portable transceiver 104 approach the vehicle has been determined to improve the temperature-related comfort felt by the user upon entering the vehicle 200. With similar regard to the heating operation, it has been determined that heating the vehicle seat and steering wheel prior to activating the vehicle HVAC system improves the temperature-related comfort felt by the user upon entering the vehicle 200. As such, through the first, second, and third operations may be altered, changed, or combined in any manner while remaining in the scope of the instant disclosure, the above-described first, second, and third operations, when performed in order, are believed to provide improved vehicle cabin temperature adjustment relative to other orders of temperature adjusting systems 120 operations.

A simplified method of operation for the system 100 is described with reference to FIG. 4. Particularly, the controller 108 and the fixed transceiver 106 determine whether the portable transceiver 104 is within range (S401). As used with respect to the method shown in FIG. 4, the range may be a maximum distance between the portable and fixed transceivers 104, 106 where the two are in communication, or it may be any lesser range therein. For example, the range referenced in the flow-chart of FIG. 4 may be within the outer circumference of any of the three zones Z1-Z3.

Once the portable transceiver 104 is detected to be in range, the controller 108 retrieves the threshold cabin temperature Tt and the sensed cabin temperature Ts and compares the two (S402). If the sensed cabin temperature Ts is greater than the threshold cabin temperature Tt (S402—YES), the controller 108 controls the temperature adjusting systems 120 to perform the cooling operation at a maximum capacity (S403). Conversely, if the sensed cabin temperature Ts is less than the threshold cabin temperature Tt (S402—NO), the controller 108 controls the temperature adjusting systems 120 to perform the heating operation at a maximum capacity (S404).

Figure 4:
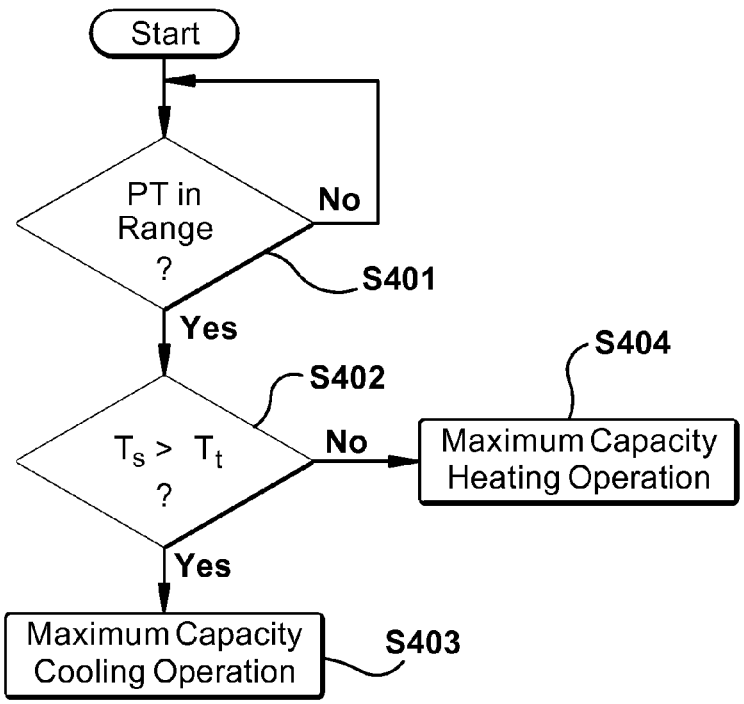
FIG. 4 is a flow-chart illustrating a related method for automatic vehicle temperature regulation.

With respect to the method illustrated in the flow-chart of FIG. 4, "maximum capacity" indicates that the temperature adjusting systems 120 are controlled to operate in a predetermined manner so as to expedite cooling or heating of the vehicle cabin. For example, maximum capacity operation may include operation of all temperature adjusting systems 120 simultaneously and at a highest level of operation. More particularly, in a cooling operation, the controller 108 may control the temperature adjusting systems 120 such that the windows and retractable roof panels are fully opened, seat and steering wheel ventilators are operated at a coolest values, and/or the vehicle HVAC system is set to maximum NC and the fan is set to the highest speed of operation. For a heating operation, the seat and steering wheel heaters are set to a hottest setting while the vehicle HVAC system is controlled to blow maximally warm air at highest fan speed operation. Alternatively, the maximum capacity may only refer to operation of the vehicle HVAC system such that maximally cool/hot air is blow from vents at a highest fan speed.

Figure 5:
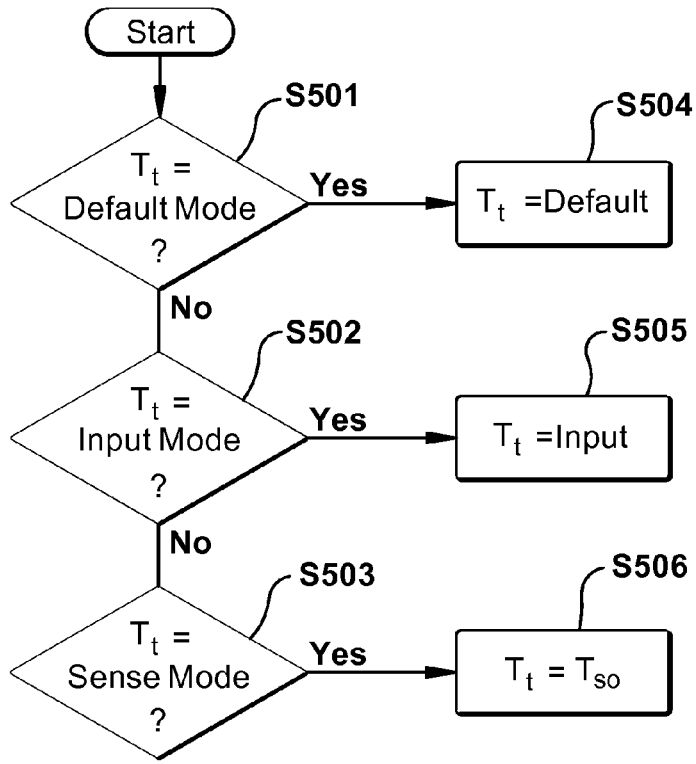
FIG. 5 is a flow-chart illustrating a method for setting a threshold cabin temperature.

It is noted that both of the above-described methods rely, at least in part, on the threshold cabin temperature Tt. A method for setting the threshold cabin temperature Tt is shown in the flow-chart of FIG. 5. Particularly, the system 100 may allow for different methods of threshold cabin temperature Tt setting. It is to be appreciated that the system 100 may be operable to accept all of the below-described threshold cabin temperature modes, or may only allow for a single threshold cabin temperature mode.

Assuming the system 100 allows for any of the three threshold temperature modes, the controller 108 determines whether the threshold cabin temperature mode is a default mode (S501), an input mode (S502), or a sensed mode (S503). The user may select the threshold cabin temperature modes through the input mechanism 118. When the threshold cabin temperature mode is in the default mode, the threshold cabin temperature Tt is set to a default value (e.g., room temperature) (S504). When the threshold cabin temperature mode is in the input mode, threshold cabin temperature Tt is set to an input value. The user may input the threshold cabin temperature Tt through either the input mechanism 118 or the portable input mechanism 124 (S505). When the threshold cabin temperature mode is set to the sensed mode, the threshold cabin temperature is set to a vehicle turn-off sensed cabin temperature Tso (S506).

With respect to the vehicle turn-off sensed cabin temperature Tso, this value is set as a sensed vehicle cabin temperature Ts at the time of a last vehicle turn-off. Accordingly, when the system 100 is operable to set in the threshold cabin temperature Tt in according to the vehicle turn-off sensed cabin temperature Tso, the controller 108 operates to detect and store the sensed cabin temperature Ts at a vehicle turn-off, and to apply the sensed cabin temperature Ts (Tso) as the threshold cabin temperature Tt during operation according to the herein described method and system 100.

It will be appreciated that various of the above-disclosed and other features and functions, or alternatives or varieties thereof, may be desirably combined into many other different systems or applications. For example, more or fewer than the three distance-defined zones described above may be applied, and the unique operations associated with each of the zones may be altered as necessary. Also, various presently unforeseen or unanticipated alternatives, modifications, variations or improvements therein may be subsequently made by those skilled in the art which are also intended to be encompassed by the following claims.

What is claimed is:

1. An automatic vehicle temperature regulation system, comprising:
   a portable transceiver;
   a fixed transceiver provided in an associated vehicle and configured to communicate with the portable transceiver;
   a temperature adjusting system configured to perform operations which adjust a temperature within a vehicle cabin; and
   a controller in communication with the fixed transceiver and the temperature adjusting system, the controller being configured to determine a distance between the portable transceiver and the fixed transceiver and to variably control the temperature adjusting system based on the determined distance between the portable transceiver and the fixed transceiver,
   wherein the controller is configured to recognize three distance-defined zones extending outward from the fixed transceiver, and to control the temperature adjusting system to perform a first operation when the portable transceiver is disposed in a first zone, to perform a second operation when the portable transceiver is disposed in a second zone, and to perform a third operation when the portable transceiver is disposed within a third zone,
   wherein the first zone is disposed furthest away from fixed transceiver and the first operation includes controlling an opening or closing of at least one of a plurality of vehicle windows and retractable roof panels, the third zone is disposed closest to the fixed transceiver and the third operation includes activating a vehicle HVAC system, and the second zone is disposed between the first and third zones and the second operation includes activating a seat ventilation system.

2. The system according to claim 1, further comprising:
   a rain detector configured to detect a raining condition; and
   a rain controller configured to prevent opening of any of the plurality of vehicle windows and retractable roof panels when the rain detector detects the raining condition.

3. The system according to claim 1, further comprising a temperature sensor configured to sense a vehicle cabin temperature, wherein
   the controller is configured to control the temperature adjusting system such that the sensed temperature within the vehicle cabin approaches a threshold cabin temperature.

4. The system according to claim 3, wherein the controller is configured to set the threshold cabin temperature at a vehicle turn-off sensed cabin temperature.

5. The system according to claim 3, wherein at least one of the controller and the portable transceiver have an input mechanism configured for entry of the threshold cabin temperature.

6. The system according to claim 1, wherein the controller is configured to control the temperature adjusting system to operate at maximum capacity when the portable transceiver is detected to be within a predetermined range of the fixed transceiver.

7. The system according to claim 1, further comprising an approach module configured to determine whether the portable transceiver is moving away from the fixed transceiver and to prevent control of the temperature adjusting system by the controller when the portable transceiver is moving away from the fixed transceiver.

8. A vehicle ECU, comprising:
a fixed transceiver configured to communicate with a portable transceiver; and
a controller in communication with the fixed transceiver, the controller being configured to determine a distance between the portable transceiver and the fixed transceiver, and to variably control a vehicle temperature adjusting system based on the determined distance between the portable transceiver and the fixed transceiver,
wherein the controller is configured to recognize a plurality of distance-defined zones extending outwardly from the fixed transceiver, to determine in which of the plurality of distance-defined zones the portable transceiver is disposed, and to control the temperature adjusting system to perform one of a first operation, a second operation and a third operation depending on the zone in which the portable transceiver is disposed,
wherein the first operation includes opening at least one of a plurality of vehicle windows and retractable roof panels, the second operation includes activating a seat ventilation system, and the third operation includes activating a vehicle HVAC system.

9. The vehicle ECU according to claim 8, wherein the controller is configured to recognize three substantially concentrically arranged annular-shaped zones extending outward from the fixed transceiver, to determine in which of the three zones the portable transceiver is disposed, and to control the temperature adjusting system to perform the first operation when the portable transceiver is disposed in a first zone closest to the fixed transceiver, to perform the third operation when the portable transceiver is disposed in a third zone furthest from the fixed transceiver, and to perform the second operation when the portable transceiver is disposed within a second zone between the first and third zones.

10. The vehicle ECU according to claim 8, further comprising:
a rain detector configured to detect a raining condition; and
a rain controller configured to prevent opening of any of the plurality of vehicle windows and retractable roof panels when the rain detector detects the raining condition.

11. The vehicle ECU according to claim 8, further comprising a temperature sensor configured to sense a temperature within the vehicle cabin, wherein
the controller is configured to control the temperature adjusting system such that the sensed temperature within the vehicle cabin approaches a threshold cabin temperature.

12. The vehicle ECU according to claim 11, wherein the threshold cabin temperature is set at one of: a sensed cabin temperature at a time of last vehicle turn-off stored in the controller; and an input threshold cabin temperature.

13. The vehicle ECU according to claim 8, wherein the controller is configured to control the temperature adjusting system to operate at maximum capacity when the portable transceiver is detected to be within a predetermined threshold range of the fixed transceiver.

14. The vehicle ECU according to claim 11, wherein the controller is configured to control the temperature adjusting system to operate at maximum capacity when the portable transceiver is detected to be within a predetermined threshold range of the fixed transceiver.

15. The vehicle ECU according to claim 8, further comprising an approach module configured to determine whether the portable transceiver is moving away from the fixed transceiver and to prevent control of the temperature adjusting system by the controller when the portable transceiver is moving away from the fixed transceiver.

16. A method for automatically regulating vehicle cabin temperature, comprising:
recognizing a plurality of predefined zones extending outwardly from the vehicle;
detecting a portable transceiver within any of the plurality of predefined zones;
determining which of the predefined zones the portable transceiver is disposed in; and
operating a vehicle temperature adjusting system in a unique manner based on the predefined zone in which the portable transceiver is disposed,
wherein recognizing the plurality of predefined zones comprises recognizing three distance-defined zones extending outward from the vehicle, and
operating the vehicle temperature adjusting system includes performing a first operation when the portable transceiver is disposed in a first zone, performing a second operation when the portable transceiver is disposed in a second zone, and performing a third operation when the portable transceiver is disposed in a third zone,
wherein the first operation includes controlling opening or closing at least one of a plurality of vehicle windows and retractable roof panels, the second operation includes activating a seat ventilation system, and the third operation includes activating a vehicle HVAC system.

17. The method according to claim 16, further comprising:
detecting entry of the portable transceiver into a preselected predefined zone; and
operating the vehicle temperature adjusting system at a maximum capacity.

18. The method according to claim 16, further comprising:
sensing and storing a vehicle cabin temperature at vehicle turn-off;
sensing a vehicle cabin temperature upon detecting the portable transceiver; and
operating the vehicle temperature adjusting system such that the sensed vehicle cabin temperature upon detecting the portable transceiver approaches the stored vehicle cabin temperature from vehicle turn-off.

19. The method according to claim 16, further comprising:
detecting whether a rain condition exists; and
preventing the opening of any of the plurality of vehicle windows and retractable roof panels when the rain condition is detected to exist.

20. The method according to claim 16, further comprising:
inputting a threshold vehicle cabin temperature;
sensing a vehicle cabin temperate upon detecting the portable transceiver; and
operating the vehicle temperature adjusting system such that the sensed vehicle cabin temperature approaches the input threshold vehicle cabin temperature.

21. The method according to claim 16, further comprising:
determining whether the portable transceiver is moving away from the fixed transceiver; and
preventing the operation of the temperature adjusting system when the portable transceiver is moving away from the fixed transceiver.

* * * * *